United States Patent
Izumi (10) Patent No.: US 10,363,630 B2
(45) Date of Patent: Jul. 30, 2019

(54) LASER PROCESSING APPARATUS AND LASER PROCESSING METHOD FOR PERFORMING LASER PROCESSING WHILE CONTROLLING REFLECTED LIGHT

(71) Applicant: FANUC CORPORATION, Yamanashi (JP)

(72) Inventor: Takashi Izumi, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 164 days.

(21) Appl. No.: 15/478,695

(22) Filed: Apr. 4, 2017

(65) Prior Publication Data

US 2017/0291258 A1     Oct. 12, 2017

(30) Foreign Application Priority Data

Apr. 8, 2016   (JP) .................. 2016-078281

(51) Int. Cl.
*B23K 26/062*     (2014.01)
*B23K 26/03*      (2006.01)
(Continued)

(52) U.S. Cl.
CPC ........ *B23K 26/0626* (2013.01); *B23K 26/032* (2013.01); *B23K 26/0622* (2015.10); *B23K 26/705* (2015.10)

(58) Field of Classification Search
CPC .................. B23K 26/0626; B23K 26/032; B23K 26/705; B23K 26/0622
See application file for complete search history.

(56) References Cited

U.S. PATENT DOCUMENTS 6,818,856 B2   11/2004 Yamazaki et al.
7,344,076 B2   3/2008 Kakui
(Continued)

FOREIGN PATENT DOCUMENTS

CN    101346207 A    1/2009
CN    103153522 A    6/2013
(Continued)

OTHER PUBLICATIONS

Machine translation of Japan Patent document No. 2013-86,130-A, Nov. 2018.*

(Continued)

*Primary Examiner* — Geoffrey S Evans
(74) *Attorney, Agent, or Firm* — RatnerPrestia (57) ABSTRACT

A laser processing method is performed in a laser processing apparatus which outputs a laser beam from a processing head to a workpiece, to perform laser processing while controlling reflected light of the output laser beam to a prescribed value or less. The laser processing method includes the step of, before performing laser processing for the workpiece, increasing laser power stepwise from laser power lower than laser power included in a processing condition of the laser processing, to emit a laser beam from a laser oscillator, and measuring reflected light by a reflected light sensor, and the step of deciding an output condition for decreasing reflected light based on a measured value of the reflected light and the prescribed value, and the step of decreasing reflected light before performing the laser processing by irradiating the workpiece with a laser beam for a predetermined period of time on the decided output condition.

12 Claims, 9 Drawing Sheets

(51) Int. Cl.
*B23K 26/06* (2014.01)
*B23K 26/0622* (2014.01)
*B23K 26/70* (2014.01)

(56) References Cited

U.S. PATENT DOCUMENTS

| | | |
|---|---|---|
| 2006/0204869 A1 | 9/2006 | Kakui |
| 2013/0140288 A1* | 6/2013 | Yu .......................... B23K 26/03 |
| | | 219/121.78 |
| 2013/0218321 A1* | 8/2013 | Miyamoto ............. B23K 26/38 |
| | | 700/166 |
| 2015/0021303 A1 | 1/2015 | Funaki et al. |
| 2017/0220927 A1* | 8/2017 | Takigawa .............. B23K 26/032 |
| 2017/0246708 A1 | 8/2017 | Mochizuki |
| 2017/0282300 A1* | 10/2017 | Mori ...................... B23K 26/60 |
| 2017/0334019 A1* | 11/2017 | Izumi ..................... B23K 26/60 |

FOREIGN PATENT DOCUMENTS

| | | |
|---|---|---|
| CN | 103372720 A | 10/2013 |
| CN | 104066543 A | 9/2014 |
| JP | 2004025204 A | 1/2004 |
| JP | 2004-074253 | 3/2004 |
| JP | 2006150373 A | 6/2006 |
| JP | 2006239697 A | 9/2006 |
| JP | 2006247681 A | 9/2006 |
| JP | 2008238195 A | 10/2008 |
| JP | 2013-86130 A * | 5/2013 |
| JP | 2013146752 A | 8/2013 |
| JP | 2014-117730 A | 6/2014 |
| JP | 2017154148 A | 9/2017 |
| WO | WO 2013/014994 A1 | 1/2013 |

OTHER PUBLICATIONS

Decision to Grant a Patent for Japanese Application No. 2016-078281, dated Jun. 12, 2018, with English translation, 4 pages.

* cited by examiner

LASER PROCESSING APPARATUS AND LASER PROCESSING METHOD FOR PERFORMING LASER PROCESSING WHILE CONTROLLING REFLECTED LIGHT

BACKGROUND OF THE INVENTION

1. Field of the Invention

The present invention relates to a laser processing apparatus and a laser processing method for performing laser processing while controlling reflected light.

2. Description of the Related Art

Laser processing is performed after processing conditions are selected from among, for example, materials to be cut or the thickness thereof. When a lot of reflected light occurs during laser processing, the laser processing is stopped, and a warning is issued. As examples of the technology for avoiding such reflected light, the following patent documents are publicly known.

Japanese Unexamined Patent Publication (Kokai) No. 2014-117730 discloses that a workpiece is irradiated, as a preliminary processing operation, with a laser beam under piercing conditions, before laser processing, while a focal position is changed, so that a position, at which the intensity of reflected light is low, is stored, and a piecing operation (drilling operation) is performed at this position.

Japanese Patent No. 4174267 discloses that a workpiece is pulse-irradiated with a laser beam before being pierced or cut, and, when the measured value of reflected light exceeds a prescribed value, the pulse width of the laser beam is reduced.

WO 2013/014994 discloses that a workpiece is irradiated with a laser beam, and whether the specified processing conditions match the workpiece is determined from the reflected light.

SUMMARY OF THE INVENTION

When a laser beam is used to perform laser processing, such as drilling, cutting, marking, welding, etc., in, for example, the following cases, a problem in processing may occur, or a lot of reflected light may occur.

(1) The case where a material, for which processing conditions are not specified, is processed.

(2) The case where processing conditions to be selected are erroneously input.

(3) The case where the same materials, the reflection rates of which are greatly different from each other due to their different surface states, inclinations, etc., are used.

When a lot of reflected light is returned to a laser oscillator, the laser oscillator is instantly broken. Further, the repeated return of a lot of reflected light to an oscillator causes a failure in the oscillator. Thus, the occurrence of reflected light causes the laser processing to stop, and makes it difficult to maintain stable production.

Thus, a technology for performing stable laser processing by controlling reflected light from a workpiece, without damaging a laser oscillator has been demanded.

A first aspect of the present invention provides a laser processing method performed in a laser processing apparatus which outputs a laser beam from a processing head to a workpiece, to perform laser processing while controlling reflected light of the output laser beam to a prescribed value or less. The laser processing method includes the steps of, before performing laser processing for the workpiece, increasing laser power stepwise from laser power lower than laser power included in a processing condition of the laser processing, to emit a laser beam from a laser oscillator, and measuring reflected light by a reflected light sensor, deciding an output condition for decreasing reflected light based on a measured value of the reflected light and the prescribed value, and decreasing reflected light before performing the laser processing by irradiating the workpiece with a laser beam for a predetermined period of time on the decided output condition.

A second aspect of the present invention provides the laser processing method in the first aspect, in which the step of increasing laser power stepwise from the low laser power, to emit a laser beam from the laser oscillator, and measuring reflected light by a reflected light sensor, includes the step of emitting a pulse laser beam having an off-time of laser output.

A third aspect of the present invention provides the laser processing method in the first or second aspect further including the step of executing an output command on a processing condition of the laser processing, to measure the reflected light, after the step of decreasing the reflected light. When the measured value of the reflected light exceeds the prescribed value, the process returns again to the step of increasing laser power stepwise from the low laser power, to emit a laser beam from the laser oscillator, and measuring reflected light by a reflected light sensor.

A fourth aspect of the present invention provides the laser processing method in the first or second aspect further including the steps of executing an output command on a processing condition of the laser processing, to measure the reflected light after the step of decreasing the reflected light, and moving a focal position of the laser beam when the measured value of the reflected light exceeds the prescribed value. The process returns again to the step of increasing laser power stepwise from the low laser power, to emit a laser beam from the laser oscillator, and measuring reflected light by a reflected light sensor.

A fifth aspect of the present invention provides the laser processing method in the second aspect, in which the pulse width of the laser beam in the step of increasing laser power stepwise from the low laser power, to emit a laser beam from the laser oscillator, and measuring reflected light by a reflected light sensor, is longer than a detection period for detecting the fact that the measured value of the reflected light exceeds the prescribed value.

A sixth aspect of the present invention provides the laser processing method in any one of the first to fifth aspects, in which a reflected light measuring unit disposed on the processing head is used to measure reflected light.

A seventh aspect of the present invention provides the laser processing method in any one of the first to fifth aspects, in which the laser oscillator is a fiber laser oscillator, and the reflected light sensor is provided in the fiber laser oscillator, to measure reflected light returned to a core part of an optical fiber.

An eighth aspect of the present invention provides the laser processing method in any one of the first to fifth aspects, in which the laser oscillator is a fiber laser oscillator, and the reflected light sensor is provided in the fiber laser oscillator, to measure reflected light returned to a clad part of an optical fiber.

A ninth aspect of the present invention provides the laser processing method in any one of the first to fifth aspects, in which the laser oscillator is a fiber laser oscillator, and the reflected light sensor is provided in the fiber laser oscillator, to measure reflected light returned to a core part and a clad part of an optical fiber.

A tenth aspect of the present invention provides a laser processing apparatus which outputs a laser beam to a workpiece, to perform laser processing while controlling reflected light of the output laser beam to a prescribed value or less. The laser processing apparatus includes a solid-state laser oscillator, a laser power source which enables pulse laser oscillation, an output control unit for executing an output command for the laser power source, a reflected light measuring unit for measuring reflected light from the workpiece, a storage unit for storing one or more prescribed values of the reflected light, a control unit for issuing a command for increasing laser power stepwise from laser power lower than laser power included in a processing condition of the laser processing, to emit a pulse laser beam, a comparison unit for comparing the measured value of the reflected light and the prescribed value, and a calculation unit for calculating an output condition for decreasing reflected light based on a result of comparison between the measured value of the reflected light and the prescribed value.

An eleventh aspect of the present invention provides the laser processing apparatus in the tenth aspect, which further includes a mechanism unit having a drive shaft that can change the focal position of a laser beam, and a mechanism control unit for controlling the mechanism unit. After a laser beam is emitted on the output condition for decreasing reflected light, when the measured value of the reflected light exceeds the prescribed value, the mechanism control unit controls the mechanism unit so as to change a focal position of a laser beam.

A twelfth aspect of the present invention provides the laser processing apparatus in the eleventh aspect, in which the laser power source is started up at a speed of 200 μsec or less, and the output control unit issues a pulse command of 200 μsec or less as an output command of the laser beam.

DETAILED DESCRIPTION

Embodiments of the present invention will be described below with reference to the accompanying drawings. In the following figures, similar members are designated with the same reference numerals. Note that the contents described below do not limit the technical scope of the inventions described in claims and the meaning of terms.

First Embodiment

Figure 1:
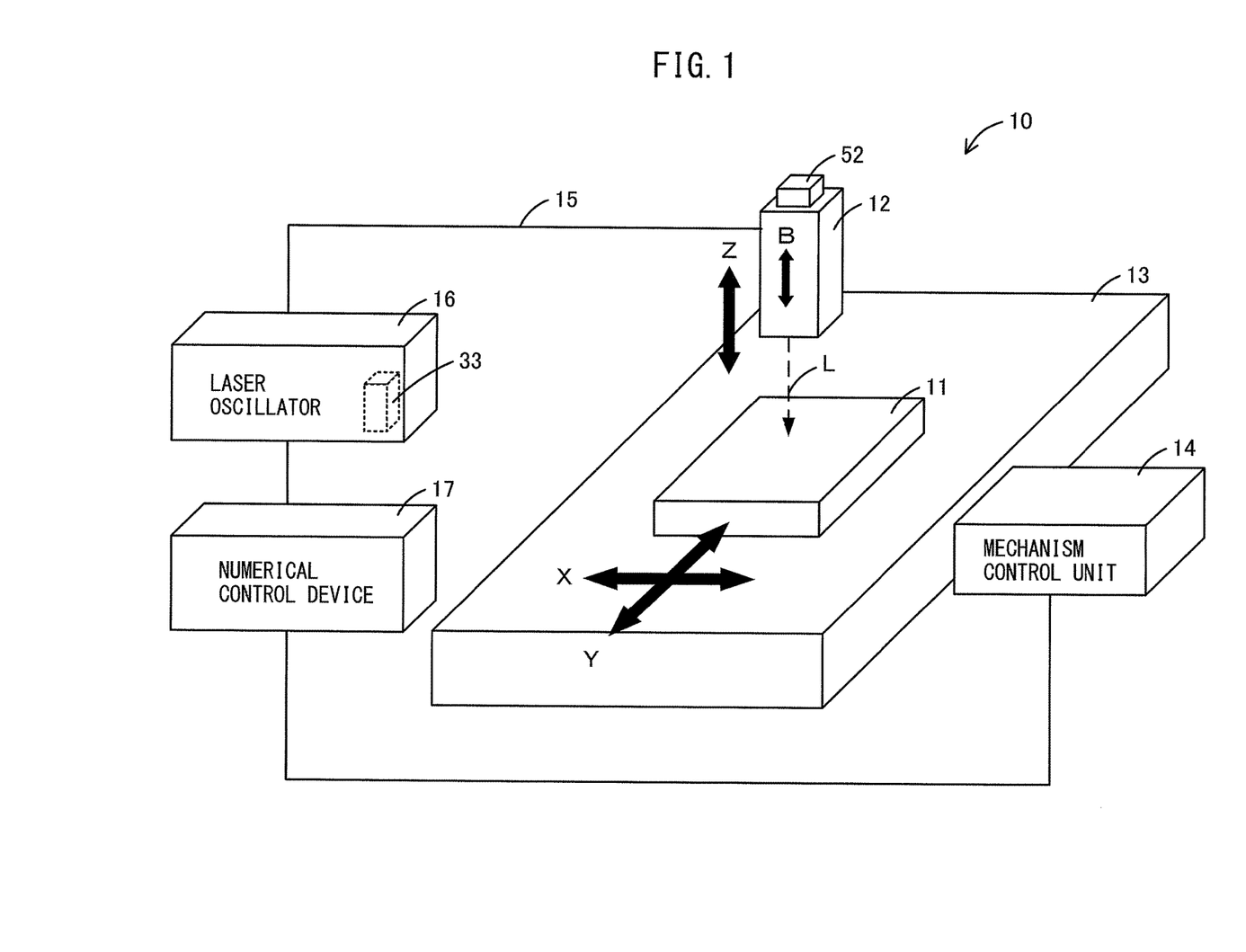
FIG. 1 is a schematic view of a laser processing apparatus in a first embodiment of the present invention.
Figure 2:
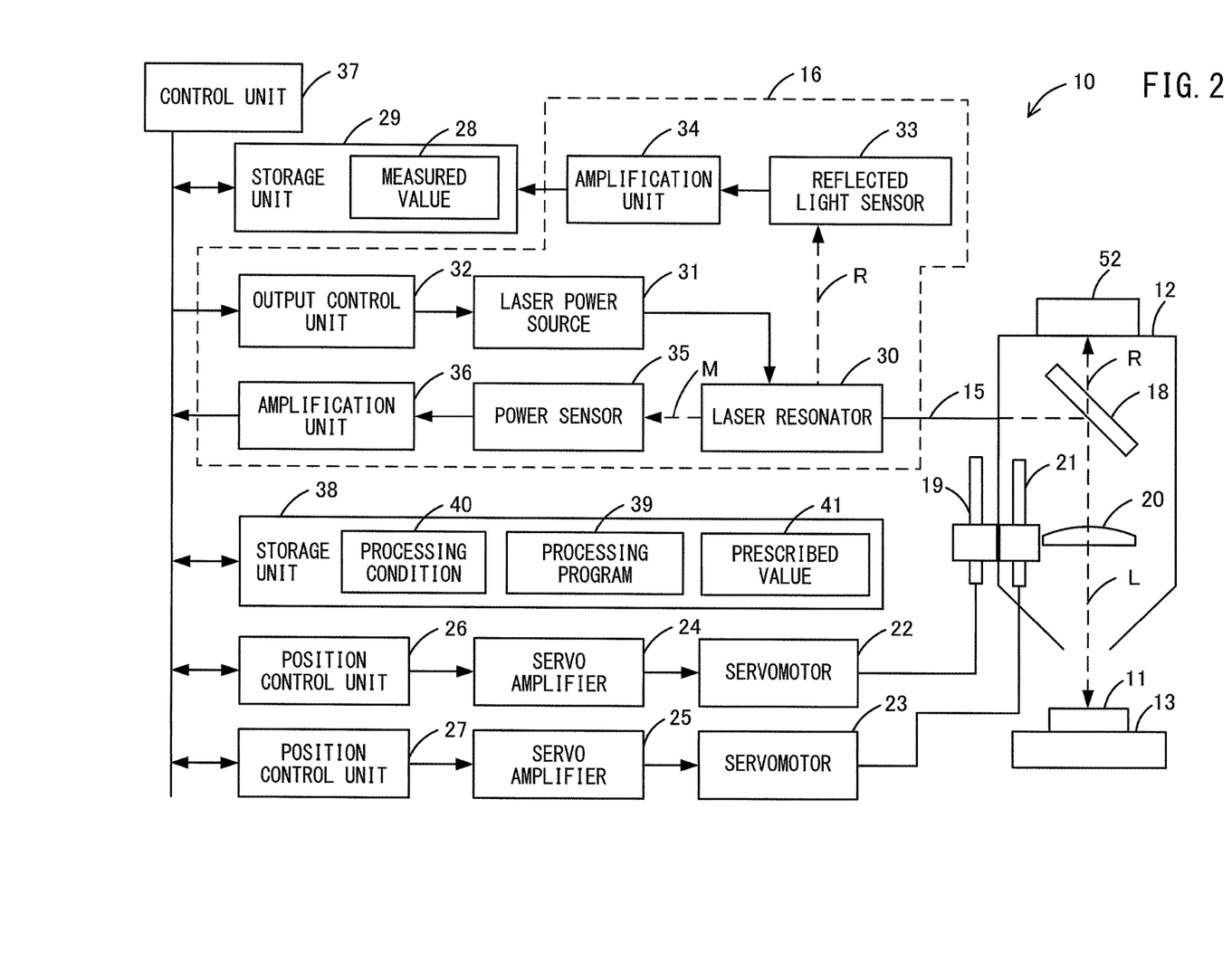
FIG. 2 is a block diagram of the laser processing apparatus in the first embodiment.

With reference to FIGS. 1 and 2, the configuration of a laser processing apparatus in a first embodiment of the present invention will be described. FIG. 1 is a schematic view of the laser processing apparatus in the first embodiment. FIG. 2 is a block diagram of the laser processing apparatus in the first embodiment. A laser processing apparatus 10 performs processing, such as drilling, cutting, marking, welding, etc. for a workpiece 11. The laser processing apparatus 10 has a processing head 12 for outputting a laser beam L to the workpiece 11, a table 13 on which the workpiece 11 is to be placed, a mechanism control unit 14 which controls driving of mechanism parts, such as drive shafts of the processing head 12 and the table 13, a laser oscillator 16 which is connected to the processing head 12 via an optical fiber 15, and a numerical control device 17 which controls the mechanism control unit 14 and the laser oscillator 16.

The processing head 12 moves in the X-, Y-, and Z-axis directions with respect to the workpiece 11 placed on the table 13. The processing head 12 also moves a collecting lens 20 in the B-axis direction, to move a focal position of the laser beam L. As shown in FIG. 2, the processing head 12 has a drive shaft 19 for movement in the Z-axis direction, and a drive shaft 21 for moving the collecting lens 20 in the B-axis direction. The table 13 has a drive shaft which is not illustrated but is used to move in the X- and Y-axis directions.

The mechanism control unit 14 has servomotors 22 and 23 for rotating the drive shafts 19 and 21, servo amplifiers 24 and 25 for controlling the rotation of the servomotors 22 and 23, and position control units 26 and 27 for controlling the position of the servomotors 22 and 23.

The laser oscillator 16 is connected to the processing head 12 via the optical fiber 15 having a diameter of 100 μm. The laser oscillator 16 is a fiber laser oscillator having a maximum output of 4 kW, and has a fiber laser resonator 30. A laser power source 31 enables the fiber laser resonator 30 to generate pulses. An output control unit 32 (e.g., pulse generator) issues an output command to the laser power source 31 in accordance with processing conditions, such as laser power, frequency, duty, etc. The laser power source 31 is started up at a speed of 200 μsec or less by a pulse command of 200 μsec or less issued by the output control unit 32. This improves the responsiveness of a laser output, and accordingly, causes an command of a laser beam to be easily associated with a measured value of reflected light.

The fiber laser resonator 30 is comprised of a plurality of laser resonators, which are not illustrated, and generates a laser beam L having large power by using a beam combiner to couple a plurality of fibers on the output side. The laser beam L is reflected by a folding mirror 18, and is applied to the workpiece 11. A reflected light sensor 33 for measuring reflected light R from the workpiece 11 is connected to the beam combiner for coupling a plurality of fibers.

The reflected light sensor 33 includes a thermoelectric sensor, a photoelectric sensor, etc., and measures the reflected light R returned to at least one of the core part and the clad part of the optical fiber 15. The measurement of two kinds of reflected light returned to the core part and the clad part enables output conditions for decreasing reflected light to be more accurately set. A measured value 28 of the reflected light sensor 33 is amplified and converted to digital value by an amplification unit 34, and is stored in a storage unit 29 (e.g., memory such as RAM/ROM). Further, a power sensor 35 which measures a monitor laser beam M to be output from a rear mirror of the laser resonator at a transmissivity of 0.5%, is connected to the fiber laser resonator 30. The power sensor 35 includes a thermoelectric sensor, a photoelectric sensor, etc. An output of the power sensor 35 is amplified and converted to digital value by an amplification unit 36, and is output to the numerical control device 17 shown in FIG. 1.

The numerical control device 17 has a control unit 37, such as a CPU, and a storage unit 38, such as a RAM or a ROM. The control unit 37 retrieves and executes a processing program 39 stored in the storage unit 38, to control the entirety of the laser processing apparatus 10 based on various commands. The processing program 39 inputs processing conditions 40 including laser power, frequency, duty, etc, based on the material, thickness, etc. of the workpiece 11, and stores the same in the storage unit 38. The storage unit 38 stores a prescribed value 41 of reflected light from the workpiece 11.

Figure 3:
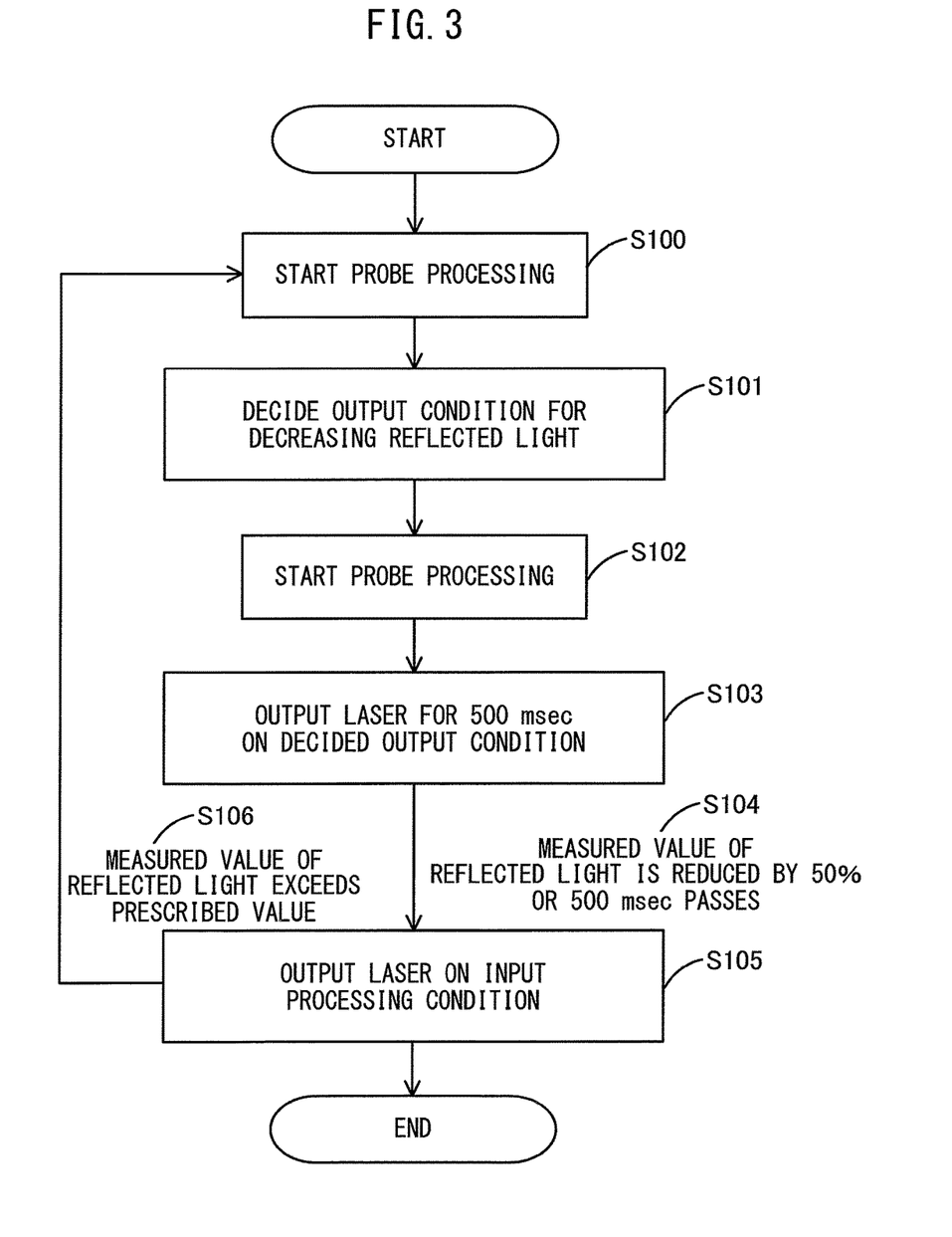
FIG. 3 is a flowchart of a laser processing method in the first embodiment.
Figure 4:
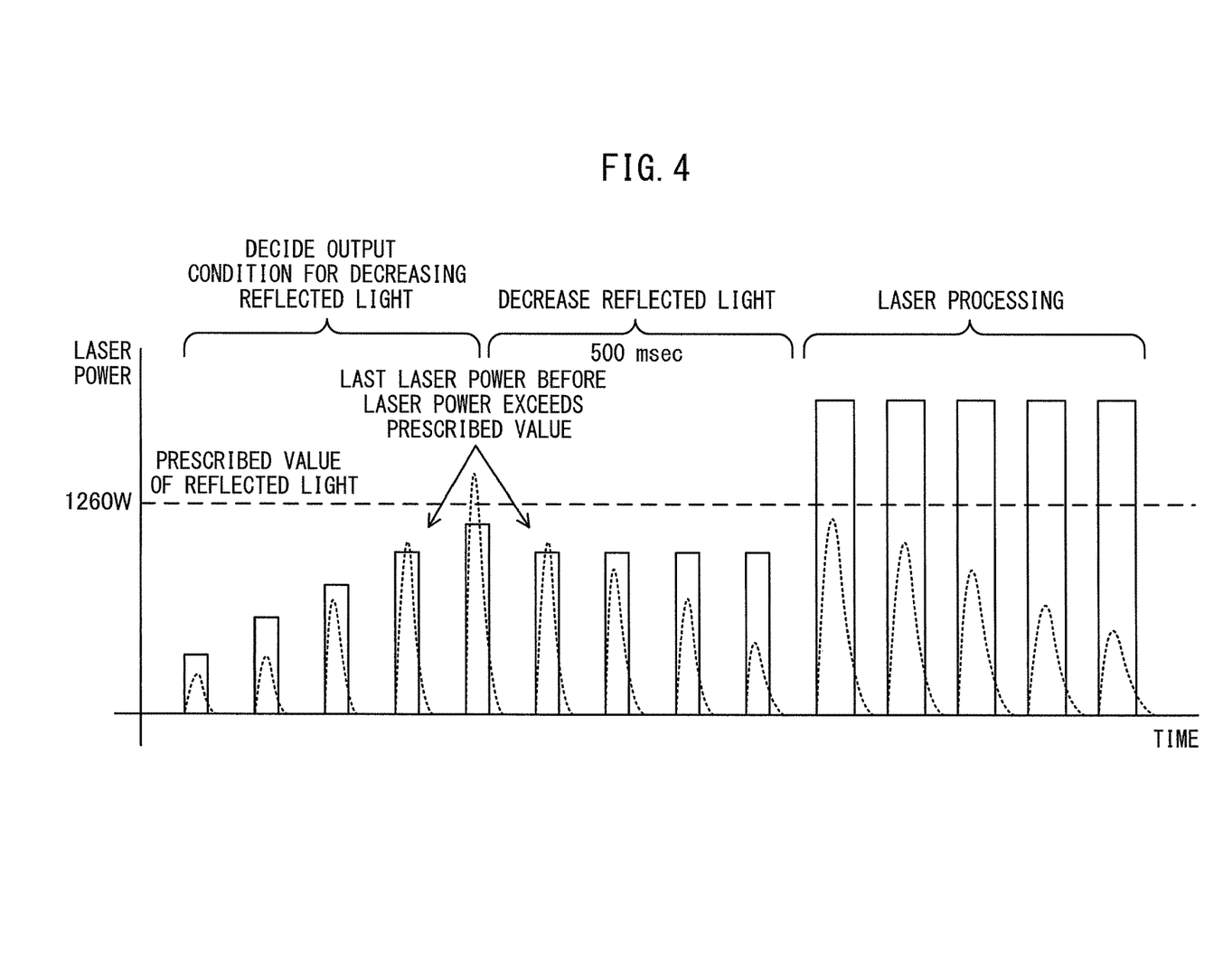
FIG. 4 is a graph indicating a correspondence relationship between commanded laser power and measured values of reflected light in the first embodiment.
Figure 5:
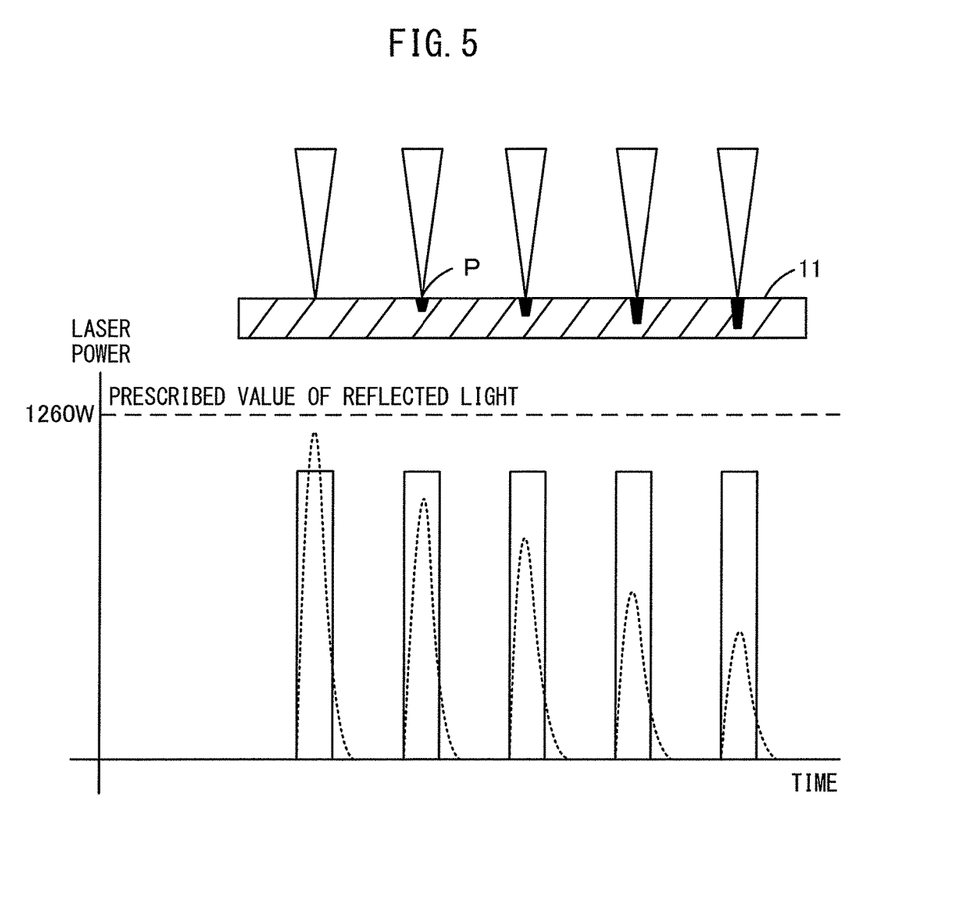
FIG. 5 is a sectional view of a workpiece which changes in a reflected light decreasing step in the first embodiment.

With reference to FIGS. 3 to 5, a laser processing method performed in the laser processing apparatus of the first embodiment will be described. FIG. 3 is a flowchart of the laser processing method in the first embodiment. FIG. 4 is a graph illustrating the relationship between the laser power in the first embodiment and the measured value of reflected light. FIG. 5 is a sectional view of a workpiece which changes in a reflected light decreasing step in the first embodiment.

As shown in FIG. 3, in step S100, probe processing starts. In this respect, as shown in FIG. 4, before a workpiece is processed by laser, the laser power is increased stepwise from a value lower than the processing condition of laser processing, and thereafter, a laser beam is emitted. When a measured value of reflected light exceeds a prescribed value, output conditions for decreasing the reflected light are decided in step S101. In this respect, the maximum power in which the measured value of reflected light does not exceed a prescribed value (e.g., 1,260 W), i.e., the last laser power before the laser power exceeds the prescribed value is decided as an output condition.

Subsequently, in step S102, probe processing starts. In other words, in step S103, a laser beam is emitted for 500 msec on the decided output condition. During this emission, as shown in FIG. 5, a cut occurs at a processing point P of the workpiece 11. This causes the reflected light returned to the optical fiber to reduce. In step S104, the measured value of the reflected light reduces to 50% or less, or after 500 msec passes, in step S105, laser processing starts on the input processing conditions (e.g., laser power: 2 kW, frequency: 500 Hz, duty: 30%).

During the laser processing, when the measured value of the reflected light exceeds a prescribed value (e.g., 1,260 W) (step S106), the process returns to step S100, and the laser power is increased stepwise again from a value lower than the processing condition of laser processing, and thereafter, a laser beam is emitted. Thus, even when the reflected light could not be decreased in the first step, the reflected light can be decreased. When the measured value of the reflected light does not exceed the prescribed value, the laser processing is completed.

In the probe processing in steps S100 and S101, the laser power may be increased stepwise by a continuous irradiation. However, it is preferable that a pulse laser beam having an off-time of laser output is emitted as shown in FIG. 4. The pulse laser beam includes an off-time of laser output, and accordingly, can easily cause the commanded laser power to be associated with the measured value of the reflected light. Further, the pulse width of the pulse laser beam is set to be longer than a detection period for detecting the fact that the measured value of the reflected light R exceeds a prescribed value. Thus, the reflected light, which exceeds the prescribed value, can be stably detected.

After the reflected light is decreased, even when the input processing conditions are not optimal for performing the laser processing in, for example, the material, state, and inclination of the workpiece and the focal point of the laser beam, the stable laser processing can be performed without damaging the laser oscillator.

Second Embodiment

Figure 6:
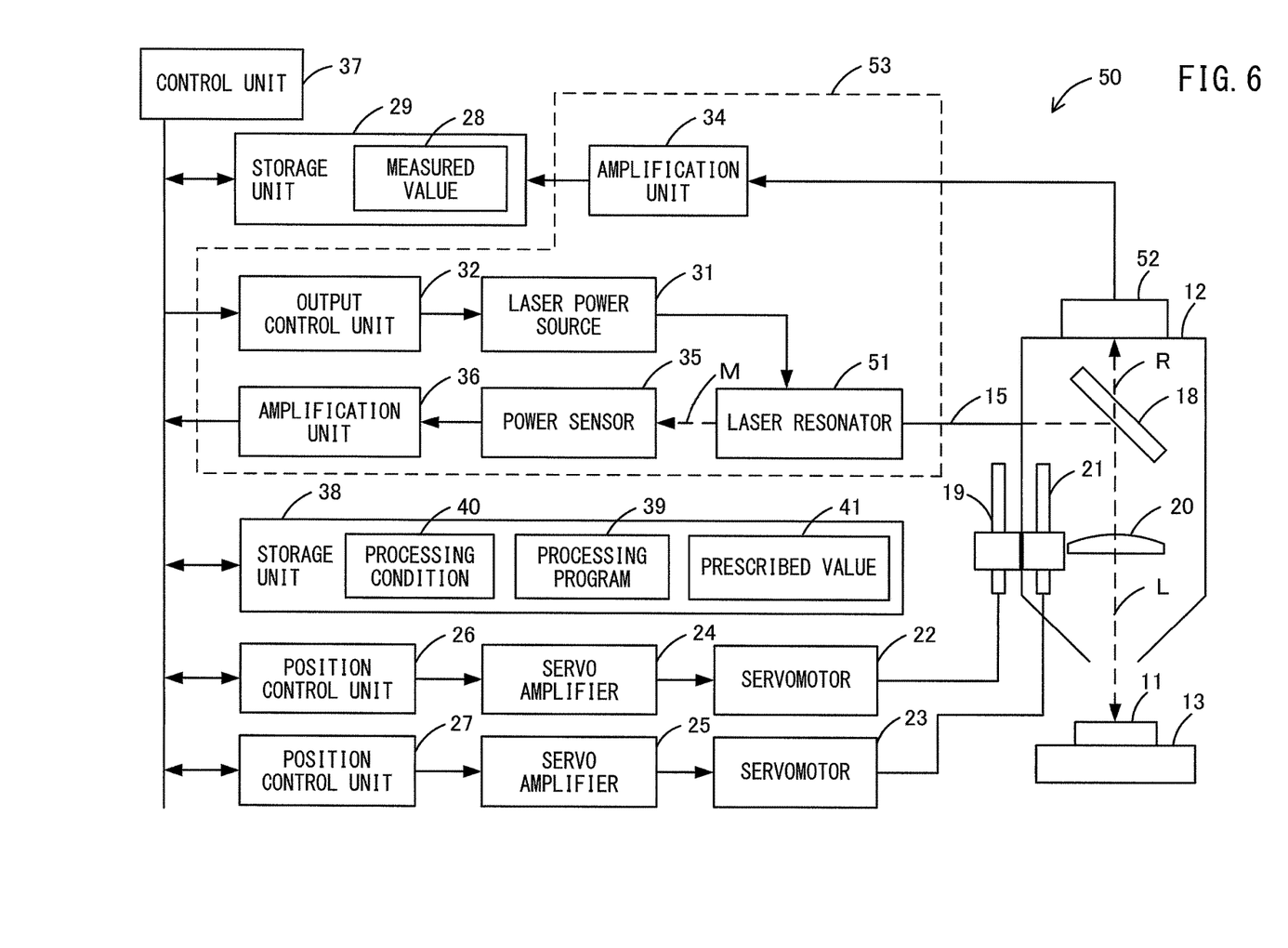
FIG. 6 is a block diagram of a laser processing apparatus in a second embodiment of the present invention.

With reference to FIG. 6, the configuration of a laser processing apparatus in a second embodiment of the present invention will be described. FIG. 6 is a block diagram of the laser processing apparatus in the second embodiment. A laser processing apparatus 50 has a fiber laser oscillator 53 having a maximum output of 4 kW. The fiber laser oscillator 53 has a fiber laser resonator 51 comprised of an optical fiber having a diameter of 100 µm and an optical fiber having a diameter of 200 µsec, although both fibers are not illustrated. Both fibers are connected by a fiber coupler, and emit a laser beam having a focused beam diameter of 300 µm. The fiber laser oscillator 53 have no reflected light sensor, or detects reflected light at a portion near the processing point, and accordingly, in the second embodiment, a reflected light measuring unit 52 disposed on the processing head 12 is used to acquire the measured value 28 of the reflected light R.

The reflected light measuring unit 52 includes, for example, a photo reflector which irradiates the workpiece 11 with reference light for monitor and receives the reflected light R for monitor from the workpiece 11. The measured value 28 measured by the reflected light measuring unit 52 is amplified and converted to digital value by the amplification unit 34, and is stored in the storage unit 29. The other structures are identical to those of the first embodiment.

Figure 7:
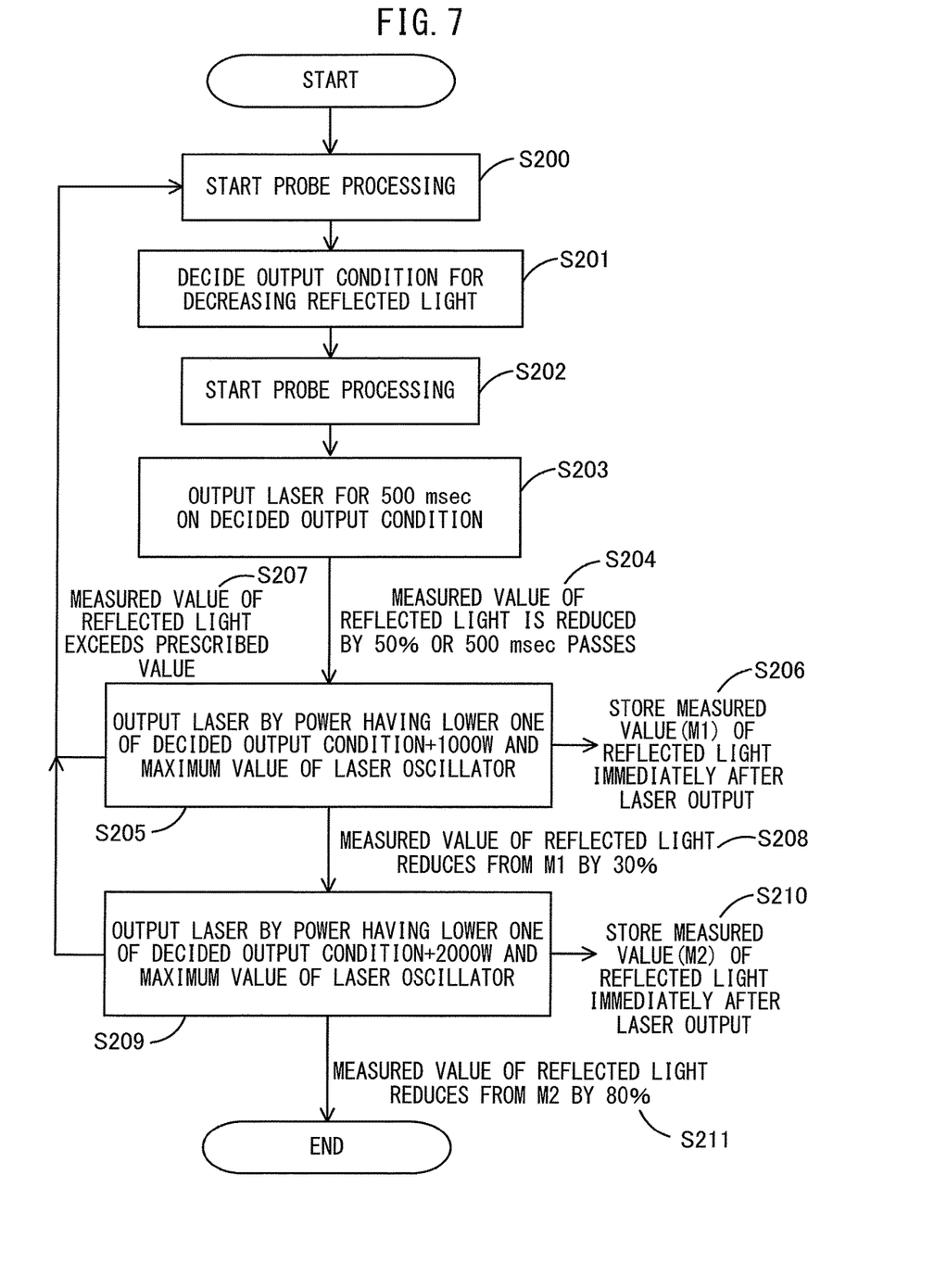
FIG. 7 is a flowchart of a laser processing method in the second embodiment.

With reference to FIG. 7, a laser processing method performed in the laser processing apparatus of the second embodiment will be described. FIG. 7 is a flowchart of the laser processing method in the second embodiment. In FIG. 7, steps S200 to S204 are identical to steps S100 to S104 of the first embodiment, and accordingly, the description thereof is omitted.

In step S205, a laser beam is emitted by the laser power obtained by adding +1,000 W to the decided output condition (if this power exceeds the maximum value of the laser oscillator, the maximum value of the laser oscillator). At this time, in step S206, a measured value (M1) of the reflected light immediately after the beginning of laser output is stored. The value M1 is used as another prescribed value of the reflected light as will be described later. Further, during this operation, when the measured value of the reflected light exceeds a prescribed value (e.g., 1,260 W) (step S207), the process returns to step S200, and the laser power is increased stepwise again from a value lower than the processing condition of laser processing, and thereafter, a laser beam is emitted. These sequences are repeated to perform laser processing with reduced reflected light.

When the measured value of the reflected light is reduced from the value M1 by 30% or more (step S208), a laser beam is emitted by the laser power obtained by adding +2,000 W to the decided output condition (if this power exceeds the maximum value of the laser oscillator, the maximum value of the laser oscillator). At this time, in step S210, a measured value (M2) of the reflected light immediately after the beginning of laser output is stored. The value M2 is used as another prescribed value of the reflected light as will be described later. Further, during this operation, when the measured value of the reflected light exceeds a prescribed value (e.g., 1,260 W) (step S207), the process returns to step S200, and the laser power is increased stepwise again from a value lower than the processing condition of laser processing, and thereafter, a laser beam is emitted. These sequences are repeated to perform laser processing with reduced reflected light. When the measured value of the reflected light is reduced from the value M2 by 80% or more (step S211), the laser processing is completed.

Third Embodiment

Figure 8:
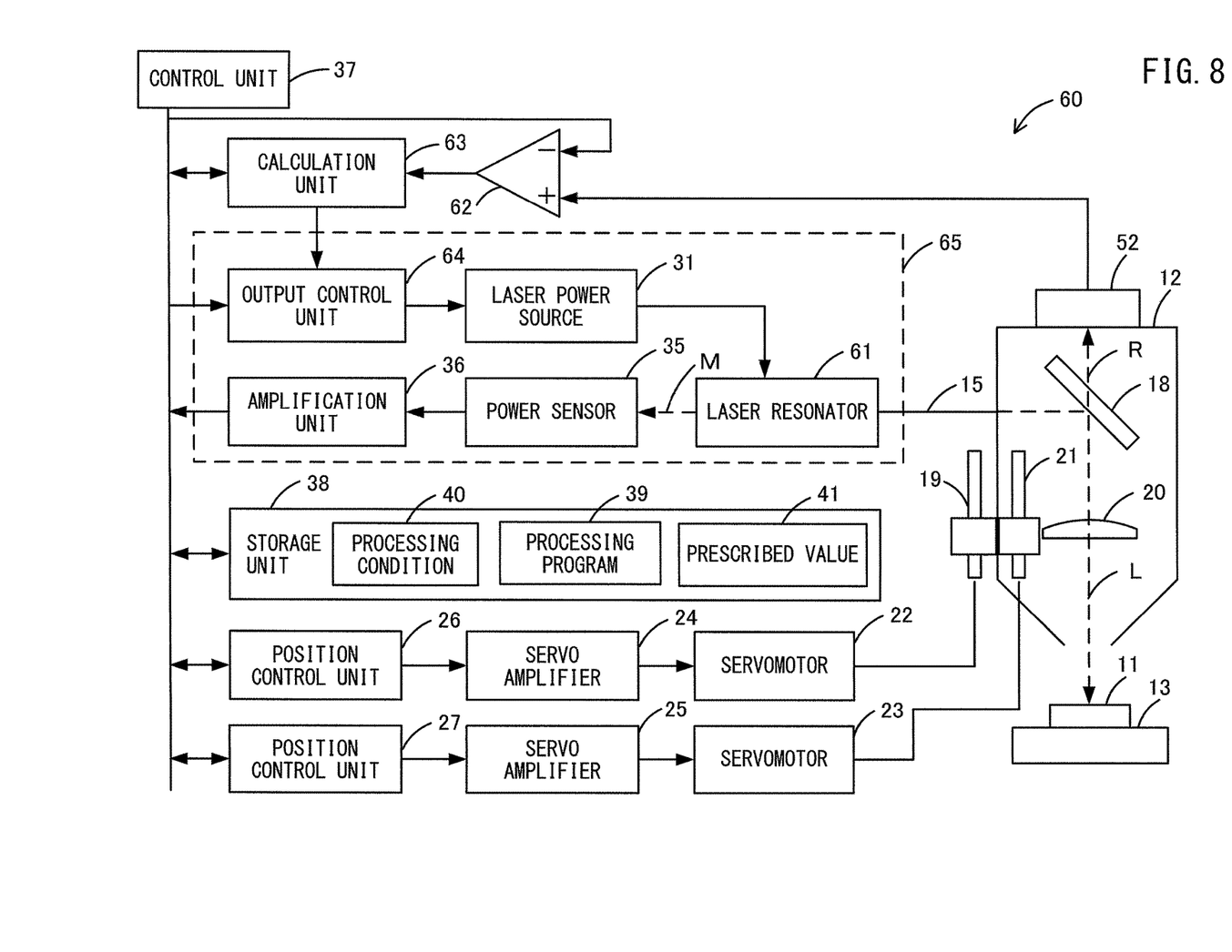
FIG. 8 is a block diagram of a laser processing apparatus in a third embodiment of the present invention.

With reference to FIG. 8, the configuration of a laser processing apparatus in a third embodiment of the present invention will be described. FIG. 8 is a block diagram of the laser processing apparatus in the third embodiment. A laser processing apparatus 60 has a fiber laser oscillator 65 having a maximum output of 6 kW. The fiber laser oscillator 65 has a fiber laser resonator 61 comprised of an optical fiber having a diameter of 100 µm and an optical fiber having a diameter of 1,000 µm, although both fibers are not illustrated. Both fibers are connected by a fiber coupler, and emit a laser beam having a large focused beam diameter of 1,000 µm. The laser beam having a diameter of 1,000 µm is difficult to return to the optical fiber having a diameter of 100 µm, and accordingly, in the third embodiment, the reflected light measuring unit 52 disposed on the processing head 12 is used to measure the reflected light R.

The measured value of the reflected light R measured by the reflected light measuring unit 52 is input to a comparison unit 62. The comparison unit 62 includes an analog circuit, such as a comparator for inputting a measured value of the reflected light R to a non-inverting input and inputting a prescribed value of the reflected light to an inverting input. When the measured value of the reflected light R does not exceed the prescribed value, a negative voltage is input to a calculation unit 63. When the measured value of the reflected light R exceeds the prescribed value, a positive voltage is input to the calculation unit 63. The calculation unit 63 includes an integrated circuit, such as a FPGA, a DSP, etc., and calculates, when the positive voltage is input, an output condition for decreasing the reflected light. The calculation unit 63 outputs the decided output condition to an output control unit 64 (e.g., pulse generator). The output control unit 64 issues an output command to the laser power source 31 in accordance with the decided output condition. The other structures are identical to those of the second embodiment, and accordingly, the description thereof is omitted.

Comparing the measured value of the reflected light with the prescribed value, and calculating the output condition for decreasing the reflected light, using hardware, such as a special electric circuit, an integrated circuit, etc., enables the detection period of the reflected light, which corresponds to the pulse width of the laser beam, to be easily acquired. Thus, the reflected light, which exceeds the prescribed value, can be reliably detected.

In another embodiment, in place of the comparison unit 62 and the calculation unit 63, a thermal switch or the like, which activates a switch when the measured value of the reflected light exceeds the prescribed value, may be used. When the thermal switch switches the output control unit 64 on, the output control unit 64 outputs a laser beam at the maximum power which does not exceeds the prescribed value.

Figure 9:
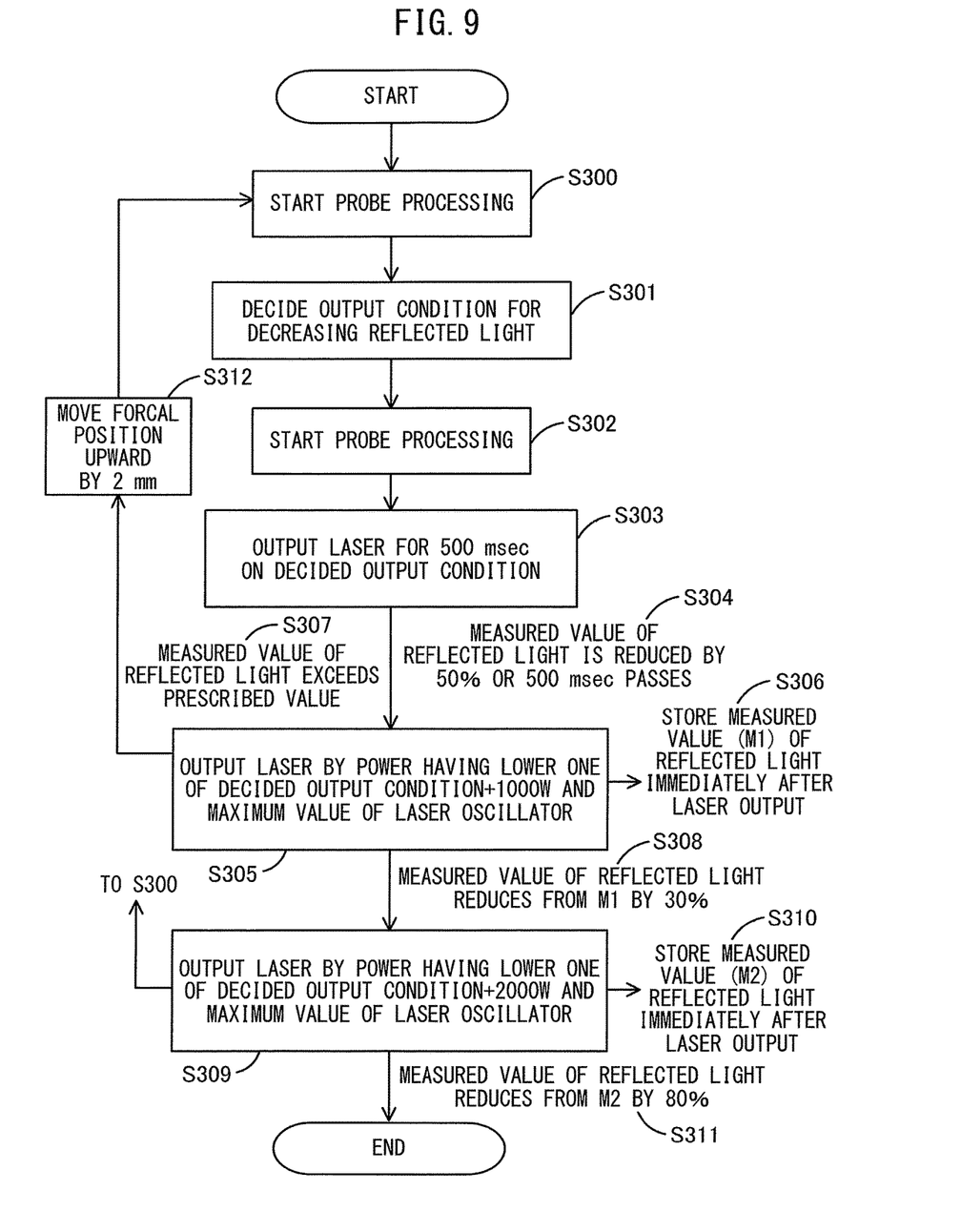
FIG. 9 is a flowchart of a laser processing method in the third embodiment.

With reference to FIG. 9, a laser processing method performed in the laser processing apparatus of the third embodiment will be described. FIG. 9 is a flowchart of the laser processing method in the third embodiment. In FIG. 9, steps S300 to S311 are identical to steps S200 to S211 of the second embodiment, and accordingly, the description thereof is omitted.

In the third embodiment, the diameter of a focused beam is large, i.e., 1,000 µm, and accordingly, when a drilling operation is performed for the workpiece 11 made of, for example, aluminum, i.e., a high reflecting material, the energy density of the laser beam is low. Thus, the workpiece 11 cannot be melted, and large reflected light continues to return, and accordingly, the drilling operation does not proceed. Hence, when, in step S305, the measured value of the reflected light exceeds a prescribed value (e.g., 1,260 W) (step S307), the B-axis in the processing head 12 is driven to move the focal position of the laser beam upward by 2 mm in step S312. Moving the focal position of the laser beam makes the laser beam, which has been reflected by the surface of the workpiece, less likely to return to the laser oscillator. Thus, the workpiece can be irradiated with larger laser power in steps S300 and S302, and accordingly, even when the reflected light could not be decreased in the first step, the reflected light can be decreased. Thus, the laser processing can be performed even for the high reflecting material that does not tend to absorb the laser beam.

In another embodiment, in steps S305 and S309, when the measured value of the reflected light exceeds another prescribed value (e.g., a higher value, 1,300 W), the process does not return to step S300, and thus, the laser processing may be stopped, and a notice may be issued by a monitor or sound, to inform that the processing has been stopped. According to this sequence, even when the material, thickness, etc. of the workpiece are not determined, the optimal output condition for decreasing the reflected light is decided in step S300, a small hole is formed in the workpiece, to reduce the reflected light in step S303, and a laser beam is emitted by a large laser power in steps S305 and S309, and accordingly, the laser processing can be completed at the shortest time.

In this respect, the operation and effect of the present invention will be described. According to the present invention, even when the set processing conditions are not optimal in, for example, the material, state, inclination, etc. of the workpiece and the focal position of the laser beam, the reflected light can be decreased, and laser processing can be stably performed without damaging the laser oscillator, and thus, the productivity is improved.

Note that the program in the above embodiments may be provided after being recorded in a non-transitory computer-readable recording medium, e.g., a CD-ROM.

Although various embodiments of the present invention have been described above, a person skilled in the art would recognize that the present invention is not limited to the embodiments described above, and various modifications can be made without departing from the scope of the claims described below.

What is claimed is:

1. A laser processing method performed in a laser processing apparatus which outputs a laser beam from a processing head to a workpiece, to perform laser processing while controlling reflected light of the output laser beam to a prescribed value or less, the laser processing method comprising the steps of:

before performing laser processing for the workpiece, increasing laser power stepwise from laser power lower than laser power included in a processing condition of the laser processing, to emit a laser beam from a laser oscillator, and measuring reflected light by a reflected light sensor;

deciding an output condition for decreasing reflected light based on a measured value of the reflected light and the prescribed value; and decreasing reflected light before performing the laser processing by irradiating the workpiece with a laser beam for a predetermined period of time on the decided output condition.

2. The laser processing method according to claim 1, wherein the step of increasing laser power stepwise from the low laser power, to emit a laser beam from the laser oscillator, and measuring reflected light by a reflected light sensor, includes the step of emitting a pulse laser beam having an off-time of laser output.

3. The laser processing method according to claim 1, further comprising the step of executing an output command on a processing condition of the laser processing, to measure the reflected light, after the step of decreasing the reflected light, wherein when the measured value of the reflected light exceeds the prescribed value, the process returns again to the step of increasing laser power stepwise from the low laser power, to emit a laser beam from the laser oscillator, and measuring reflected light by a reflected light sensor.

4. The laser processing method according to claim 1, further comprising the steps of:

executing an output command on a processing condition of the laser processing, to measure the reflected light after the step of decreasing the reflected light; and moving a focal position of the laser beam when the measured value of the reflected light exceeds the prescribed value, wherein the process returns again to the step of increasing laser power stepwise from the low laser power, to emit a laser beam from the laser oscillator, and measuring reflected light by a reflected light sensor.

5. The laser processing method according to claim 2, wherein the pulse width of the laser beam in the step of increasing laser power stepwise from the low laser power, to emit a laser beam from the laser oscillator, and measuring reflected light by a reflected light sensor, is longer than a detection period for detecting the fact that the measured value of the reflected light exceeds the prescribed value.

6. The laser processing method according to claim 1, wherein a reflected light measuring unit disposed on the processing head is used to measure reflected light.

7. The laser processing method according to claim 1, wherein the laser oscillator is a fiber laser oscillator, and the reflected light sensor is provided in the fiber laser oscillator, to measure reflected light returned to a core part of an optical fiber.

8. The laser processing method according to claim 1, wherein the laser oscillator is a fiber laser oscillator, and the reflected light sensor is provided in the fiber laser oscillator, to measure reflected light returned to a clad part of an optical fiber.

9. The laser processing method according to claim 1, wherein the laser oscillator is a fiber laser oscillator, and the reflected light sensor is provided in the fiber laser oscillator, to measure reflected light returned to a core part and a clad part of an optical fiber.

10. A laser processing apparatus which outputs a laser beam to a workpiece, to perform laser processing while controlling reflected light of the output laser beam to a prescribed value or less, the laser processing apparatus comprising:

a solid-state laser oscillator;

a laser power source which enables pulse laser oscillation;

an output control unit for executing an output command for the laser power source;

a reflected light measuring unit for measuring reflected light from the workpiece;

a storage unit for storing one or more prescribed values of the reflected light;

a control unit for issuing a command for increasing laser power stepwise from laser power lower than laser power included in a processing condition of the laser processing, to emit a pulse laser beam before performing laser processing for the workpiece;

a comparison unit for comparing the measured value of the reflected light and the prescribed value; and a calculation unit for calculating an output condition for decreasing reflected light based on a result of comparison between the measured value of the reflected light and the prescribed value before performing laser processing for the workpiece.

11. The laser processing apparatus according to claim 10, further comprising: a mechanism unit having a drive shaft that can change the focal position of a laser beam; and a mechanism control unit for controlling the mechanism unit, wherein, after a laser beam is emitted on the output condition for decreasing reflected light, when the measured value of the reflected light exceeds the prescribed value, the mechanism control unit controls the mechanism unit so as to change a focal position of a laser beam.

12. The laser processing apparatus according to claim 11, wherein the laser power source is started up at a speed of 200 sec or less, and the output control unit issues a pulse command of 200 sec or less as an output command of the laser beam.

* * * * *